(12) United States Patent
Dunlop

(10) Patent No.: US 6,270,301 B1
(45) Date of Patent: Aug. 7, 2001

(54) MOUNTING APPARATUS FOR FRONT WALL OF PICK-UP TRUCK CARGO BOX

(76) Inventor: Keith A. Dunlop, 4235 Lou Mar Ct., Orion, MI (US) 48359-1908

( * ) Notice: Subject to any disclaimer, the term of this patent is extended or adjusted under 35 U.S.C. 154(b) by 0 days.

(21) Appl. No.: 09/618,795

(22) Filed: Jul. 18, 2000

(51) Int. Cl.$^7$ ...................................................... B60P 7/08
(52) U.S. Cl. ........................ 410/115; 410/102; 410/104; 410/106; 410/108
(58) Field of Search .................................. 410/101, 102, 410/104, 105, 106, 108, 110, 115; 248/499

(56) References Cited

U.S. PATENT DOCUMENTS

| | | | |
|---|---|---|---|
| 3,428,282 | * | 2/1969 | Pernice .................................. 410/110 |
| 4,650,382 | * | 3/1987 | Johnson ................................. 410/110 |
| 4,760,986 | * | 8/1988 | Harrison ............................ 410/110 X |
| 4,850,769 | * | 7/1989 | Matthews ............................... 410/105 |
| 4,850,770 | * | 7/1989 | Millar, Jr. ............................. 410/110 |
| 4,867,497 | | 9/1989 | Jayne . |
| 4,936,724 | * | 6/1990 | Dutton .................................. 410/110 |
| 4,953,820 | | 9/1990 | Yoder . |
| 5,228,739 | | 7/1993 | Love . |
| 5,302,064 | * | 4/1994 | Davis .................................... 410/115 |
| 5,533,848 | * | 7/1996 | Davis .................................... 410/105 |
| 5,584,521 | | 12/1996 | Hathaway et al. . |
| 5,873,688 | * | 2/1999 | Wheatley .............................. 410/106 |
| 6,039,520 | * | 3/2000 | Cheng ................................... 410/106 |
| 6,129,490 | * | 10/2000 | Erskine et al. ........................ 410/110 |
| 6,176,658 | * | 1/2001 | Rowe .................................... 410/106 |
| 6,196,777 | * | 3/2001 | Price ..................................... 410/102 |

\* cited by examiner

*Primary Examiner*—Stephen T. Gordon
(74) *Attorney, Agent, or Firm*—Charles W. Chandler

(57) ABSTRACT

A tiedown rail system including a plurality of tie anchors secures cargo on a pickup truck bed. The invention includes an elongated tubular four-sided rail that is mounted on the rim of a pickup truck cargo bed front wall. A three-sided channel could also be used, having openings that face the truck cab. The rail system includes repositionable anchor assemblies for attaching an end of a cargo strap to secure transported cargo in the truck bed.

8 Claims, 6 Drawing Sheets

MOUNTING APPARATUS FOR FRONT WALL OF PICK-UP TRUCK CARGO BOX

BACKGROUND OF THE INVENTION

Pick-up trucks are used for carrying a load, which must be anchored in position on the bed of the cargo box. Manufacturers, until recently, provided stake holes in the cargo box sidewalls for mounting various anchoring devices that receive a cable attached to the load.

However, such stake holes have been eliminated thereby creating a problem for anchoring a load, such as a motorcycle in an upright position. An undesirable solution is to either form a hole in the cargo box for receiving an anchoring device, or welding an anchoring device to the cargo box. This detracts from the vehicle appearance, and reduces the value of the vehicle.

Examples of prior art anchoring devices that may be connected to a cargo box may be found in U.S. Pat. No. 5,228,739 issued Jul. 20, 1993, for "Truck Cap Clamp" to Dale Love; and U.S. Pat. No. 5,584,521 issued Dec. 17, 1996 for "Vehicle Modular Rail System" to Richard C. Hathaway et al.; U.S. Pat. No. 4,953,820 issued Sep. 4, 1990 for "Lamp with Retaining Ring" to Ronald L. Yoder employs a clamp mounted on a wall of a cargo box. The location of the clamp is limited to the location of an opening in the cargo box wall.

U.S. Pat. No. 4,867,497 issued Sep. 19, 1989 for "Load Supporting Rack for Attachment to Pick-up Truck Box" to Gilbert Jayne. A pair of brackets locates a lower truss on the top edge of the front panel. The brackets cooperate with a pair of legs for supporting the load.

Merely placing a mounting bracket on the top edge of the cargo box front wall is usually insufficient for maintaining a load without a supplemental means cooperating with the bracket. One reason is that the top edge (rim) of some vehicles is bent from a relatively thin metal. Applying a load on a bracket that straddles the rim of the front wall will bend the wall.

The broad purpose of the present invention is to provide an improved mounting apparatus that can be mounted on the front wall of a cargo box for anchoring a cable or the like, preferably, without drilling supplemental holes into or welding an anchoring device on the cargo box.

The preferred embodiment of the invention comprises an elongated tubular four-sided rail that is mounted on the rim of the cargo box front wall. A three-sided channel could also be used, having openings that face the cab.

The manufacturers of certain modern pick-up trucks provide openings along the rim facing the cab. The preferred rail has openings disposed immediately above the openings in the cargo box rim. A clamp is mounted between the cargo box and the cab, adjacent the opening in the rim and the corresponding opening in the rail. Each clamp has an upper horizontal arm that is disposed in the opening of the rail, and a lower arm disposed in the opening in the cargo box. A toe on the lower arm extends toward the upper arm and abuts the inside horizontal surface of the rim. The rail has a vertical opening for inserting a screw into a tapped hole into the upper arm that is aligned with the toe on the lower arm. The rail and the rim are clamped between the toe and the screw. This provides a means for connecting the rail to the cargo box in which the clamp is basically hidden and does not require drilling holes or welding eyes to the cargo box.

A pair of eyes for receiving a clamp is welded to the rail. In addition, a U-shaped channel is mounted on the rail with an eye for receiving a cable hook. The channel straddles the rail and can be adjusted to a selected position along the length of the rail.

In some vehicles, the rim of the cargo box is made of a relatively thin metal, which tends to bend under a load. For these applications, a horizontal wing is welded to each end of the rail. Each wing is seated on a cargo box sidewall, preventing the rail from pivoting around its longitudinal axis, by reinforcing the cargo box front wall. The wings also have anchoring holes for attaching an anchoring cable.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
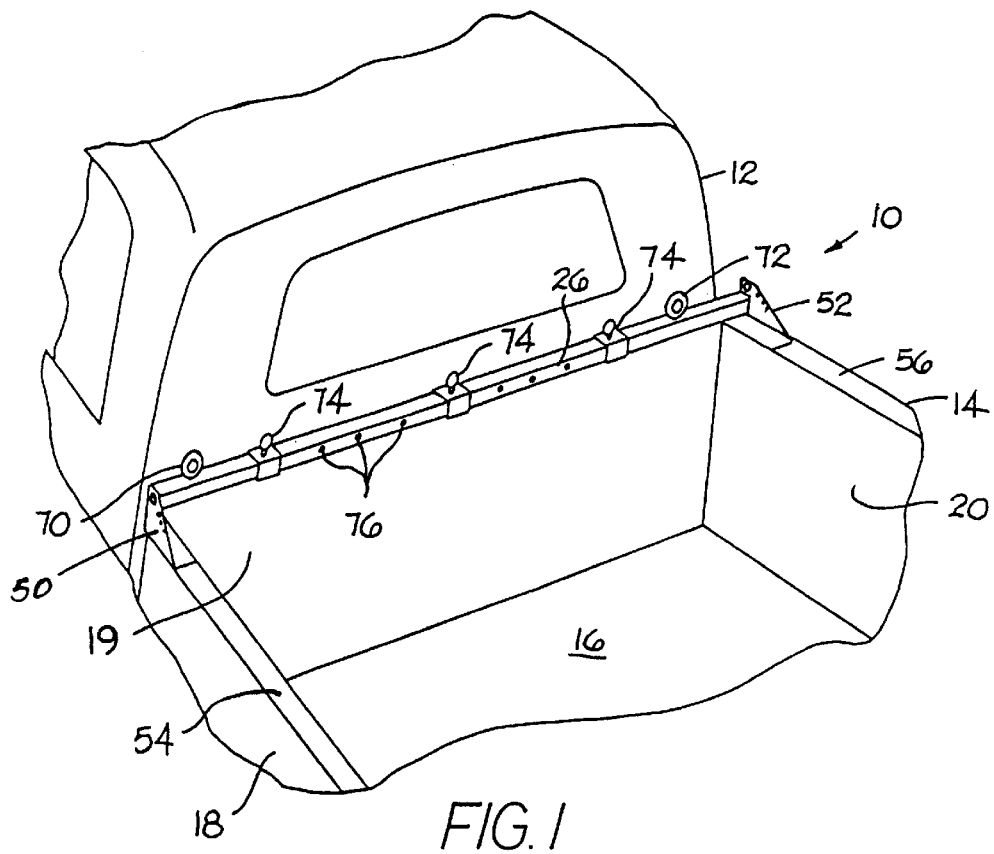
FIG. 1 illustrates an anchoring rail mounted on the top rim of the forward wall of a cargo box.

Referring to the drawings, FIG. 1 illustrates a conventional pick-up truck, generally indicated at 10, having a cab with a rear wall 12 containing a window, and a rearward cargo box 14. Cargo box 14 has a bed 16, a sidewall 18, and a second sidewall 20, parallel to sidewall 18. Both sidewalls are attached in the conventional manner to opposite ends of a sheet metal front wall 19. Front wall 19, as shown in FIG. 4, has a top rim 22 with a generally horizontal ledge.

Rim 21 extends the full width of the front wall and has a plurality of spaced openings 24 facing the cab. The openings are immediately below the horizontal ledge.

Figure 4:
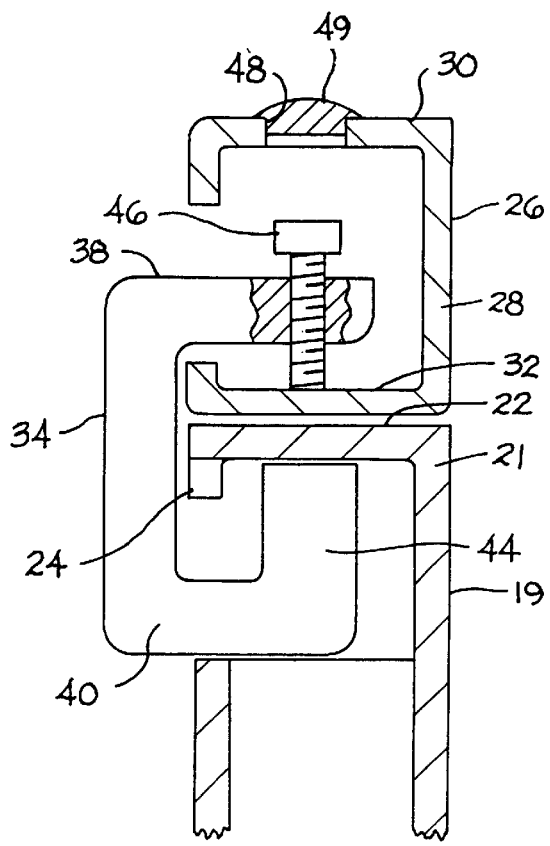
FIG. 4 illustrates a mounting clamp connecting the mounting rail to the cargo box rim.
Figure 10:
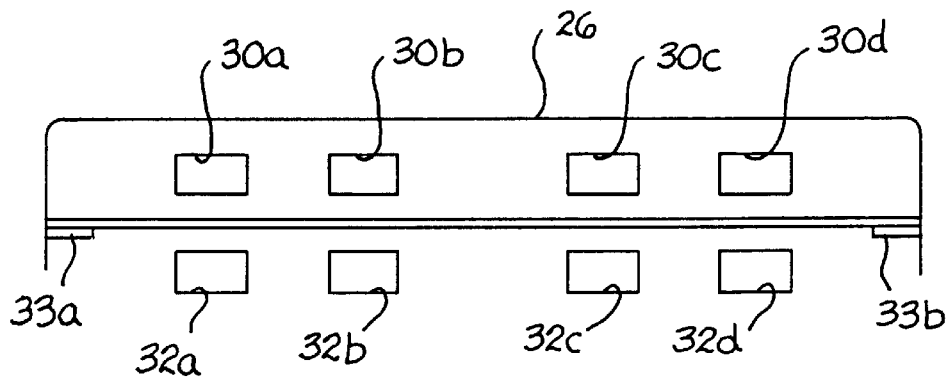
FIG. 10 illustrates the preferred rail showing the openings.

The preferred mounting apparatus comprises an elongated rail 26, as viewed in FIG. 4, having a wall 28, a top wall 30 and a bottom wall 32. Referring to FIG. 10, the rail preferably has four spaced openings 30a, 30b, 30c and 30d, each about 1" square. The openings are formed in the rail so as to be located above openings 32a, 32b, 32c and 32d in the forward wall of the cargo box.

For illustrative purposes, the rail is made of steel and has an outside diameter of 1½" and a length of about 60 inches.

To protect the finish on the cargo box, a pair of foam adhesive protective pads 33a and 33b, about ¼" thick, are mounted between the bottom of the rail ends and ledge 22.

Figure 3:
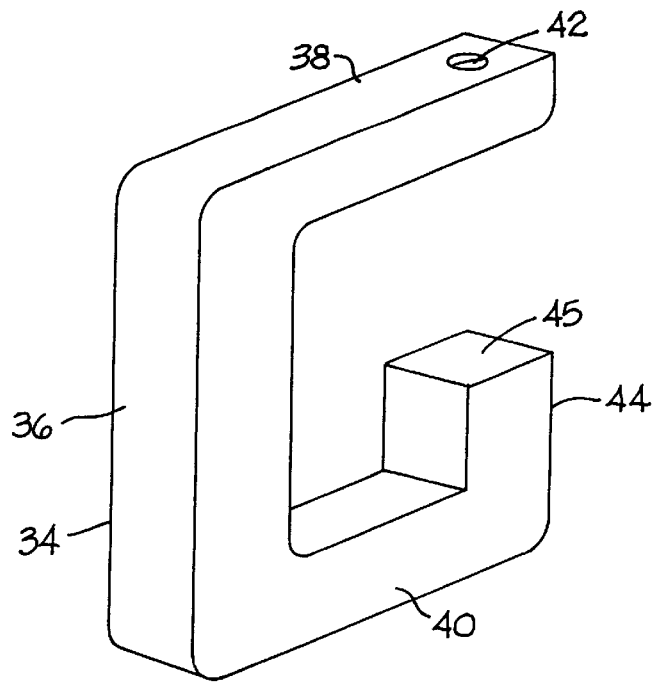
FIG. 3 is an enlarged view of a typical mounting clamp.

A plurality of identical steel clamps connects the rail to the rim of the cargo box. A typical clamp is illustrated at 34 in FIGS. 3 and 4. Clamp 34 has a vertical body 36, 2¼" high, an upper arm 38 and a lower arm 40. The upper and lower arms are parallel to one another and extend from the rear of the body about 1⅝". The upper arm has a tapped opening 42 formed along an axis parallel to body 36. An integral toe 44 on the lower arm provides a clamping surface 45 parallel to arm 38 and aligned with tapped opening 42. A hex head clamping screw 46 is threadably mounted in opening 42, as illustrated in FIG. 4.

The rail has a top access opening 48 for inserting the clamping screw into opening 42 and to permit a tool to engage the hex opening of the screw. The screw is tightened such that bottom wall 32 of the rail and rim 21 of the cargo box are clamped tightly together between the clamping screw and toe 44. This permits the rail to be securely but releasably connected to the cargo box without forming additional holes in the cargo box. A plastic cap 49 is inserted into access opening 48 for appearance purposes.

For those vehicles having a relatively thin sheet metal cargo box front wall, the rail has a pair of triangularly-shaped metal wings 50 and 52 welded to the opposite ends of the rail. The two wings are seated on the top rims 54 and 56 of the sidewalls. The two wings are identical except for a right and left-hand relationship.

Figure 5:
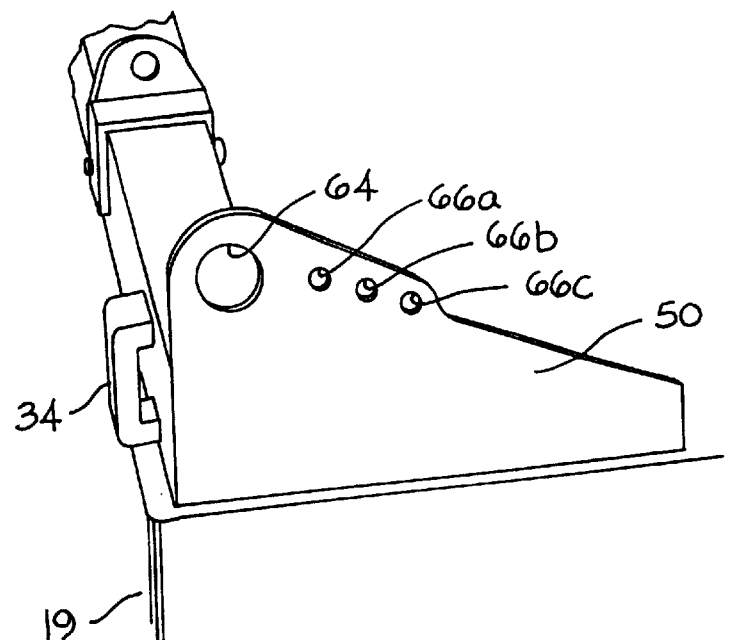
FIG. 5 illustrates a wing mounted on the end of the rail.
Figure 6:
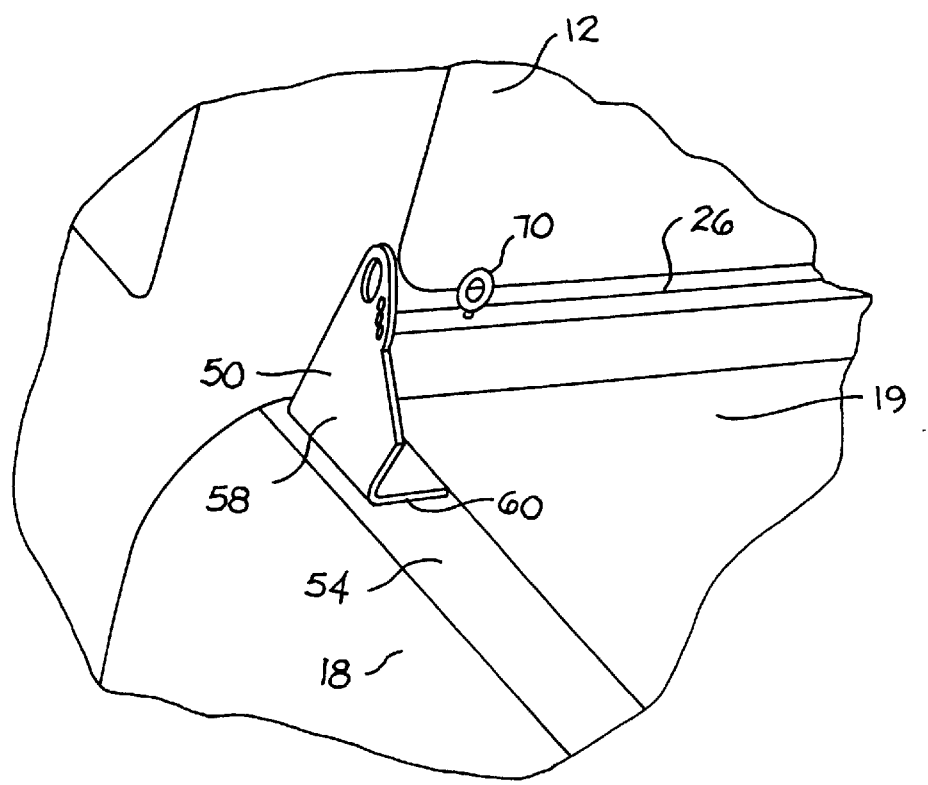
FIG. 6 is another view showing the wing and the rail.
Figure 7:
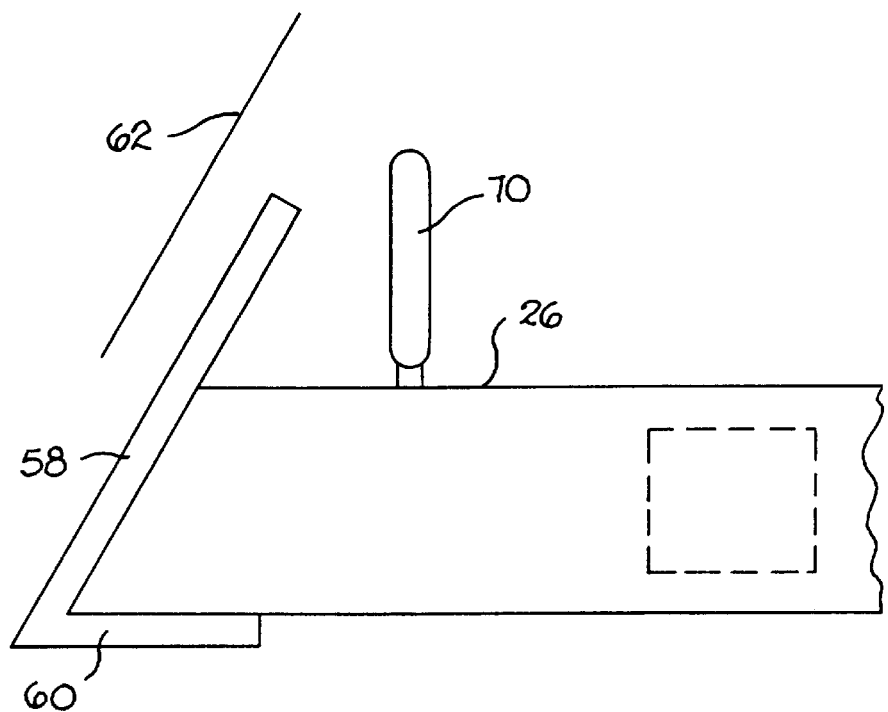
FIG. 7 is still another view showing the manner in which the rail is attached to the wing.

Referring to FIGS. 5 and 6, wing 50 has an upright wall 58 and a base 60. Base 60 is seated on rim 54. The wing preferably comprises a metal panel is about 3/16" thick and about 6" long. The base is about 1¼" wide and wall 58 is about 3¼" high at its highest point. Wall 58 is bent as illustrated in FIG. 7 at an angle that generally corresponds to the curvature of side 62 of the truck cab for aesthetic purposes. Wall 58 has a relatively large anchor opening 64 and three smaller anchor openings 66a, 66b and 66c. FIG. 5 also gives an idea of how clamp 34 is mounted between the cab and the cargo box to connect the rail to the cargo box.

Figure 8:
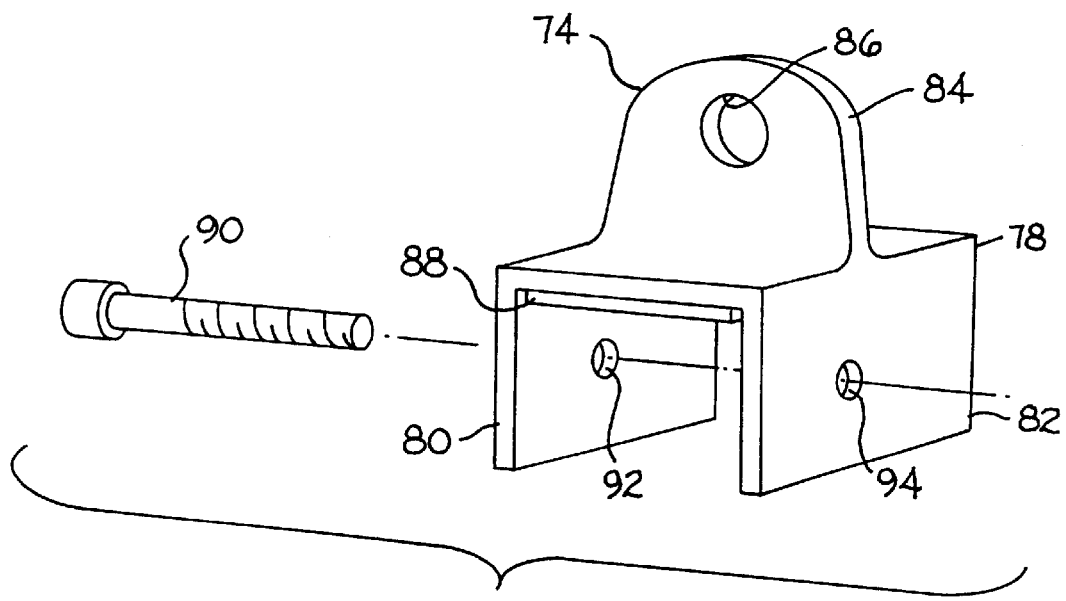
FIG. 8 is a view of a mounting bracket.

In addition to anchor opening 64, a pair of steel eyes 70 and 72 is welded to the top rail, as illustrated in FIGS. 1 and 6. In addition, a plurality of anchor brackets 74 are mounted on the rail. The rail has a series of spaced openings 76 in both of its spaced vertical walls. A typical anchoring bracket comprises a channel-shaped body 78, as illustrated in FIG. 8, with a pair of parallel sidewalls 80 and 82 spaced a distance slightly wider than the rail so the sidewalls will straddle the rail. An eye 84 is welded to the top of the bracket with an anchor-opening 86 for attaching a cable or the like. A foam pad 88 is mounted on the under surface of the bracket to prevent rattling.

A fastener 90 or other suitable quick-release device may be inserted through a pair of aligned openings 92 and 94 and through a selected pair of aligned openings 76 in the rail. This permits the user to mount an anchoring bracket in a selected position along the length of the rail.

Figure 2:
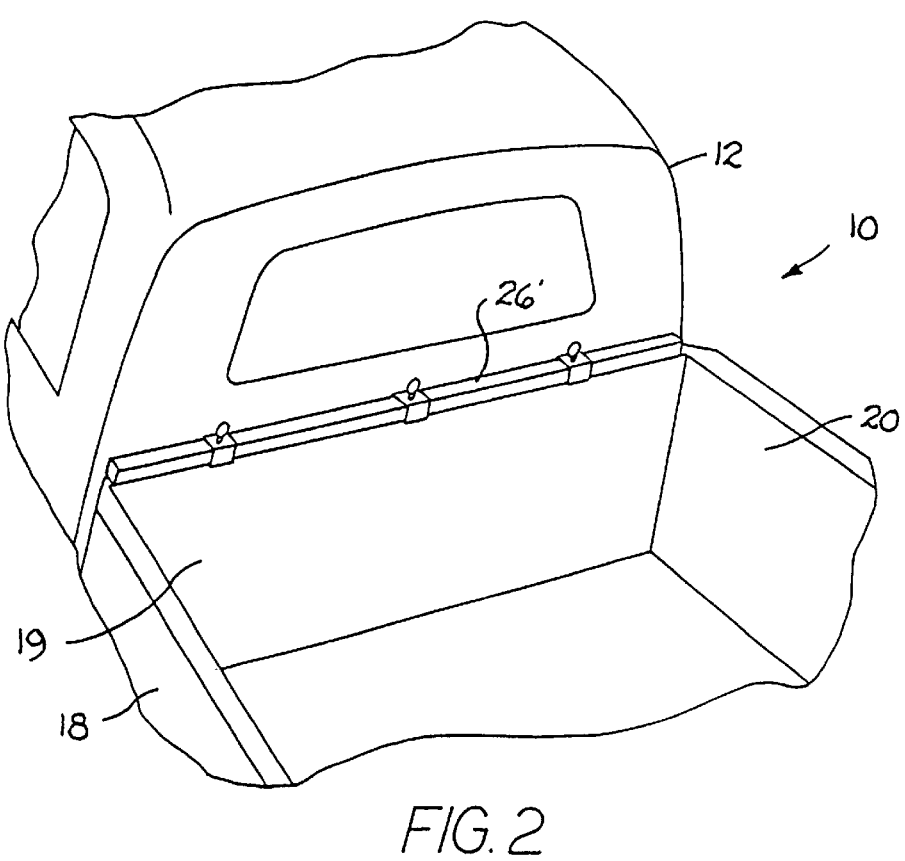
FIG. 2 illustrates another embodiment of the invention.
Figure 11:
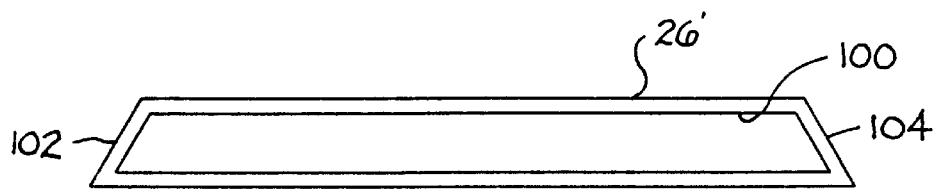
FIG. 11 shows another rail having a channel-shaped configuration forming a continuous opening along the length of the rail.

FIGS. 2 and 11 show another embodiment of the invention, which is identical to the embodiment of FIG. 1, except that rail 26' is a channel-shaped member having a rear opening 100 that extends the full length of the rail to receive the upper arm of the clamps. This embodiment of the invention is employed where the forward wall of the cargo box is sufficiently sturdy so that wings 50 and 52, illustrated in FIG. 1, are not required. A pair of caps 102 and 104 are welded to the ends of the rail.

Figure 9:
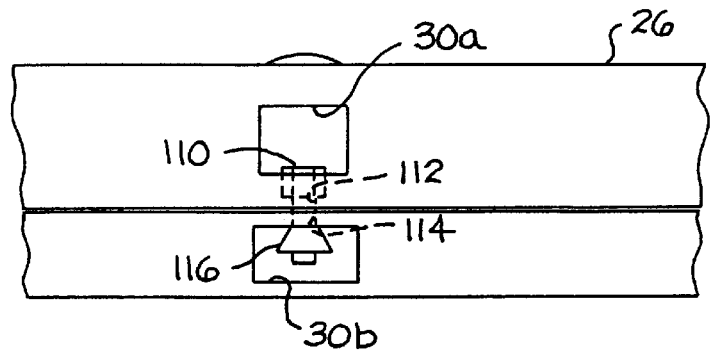
FIG. 9 is a view of another embodiment of the invention looking at the openings in the rail and the rim to show the rail screwed to the cargo box using a threaded fastener.

FIG. 9 illustrates another embodiment of the invention in which rail 26 is used where the clamps are not available. In this case, a bolt 110 is threaded through a suitable opening 112 in the bottom of the rail and a similar opening 114 in the rim ledge. A well nut 116 is attached to the fastener to rigidly connect the rail to the cargo box.

Figure 12:
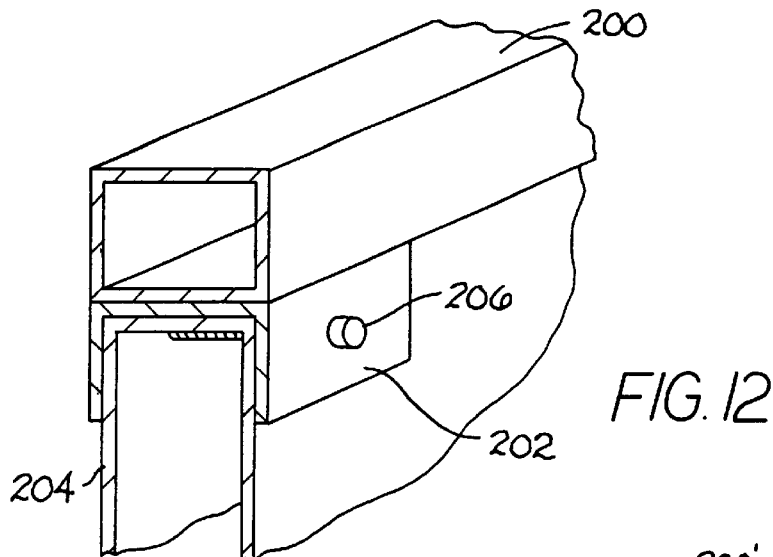
FIGS. 12–14 show other types of structure for connecting the rail to the cargo box.
Figure 13:
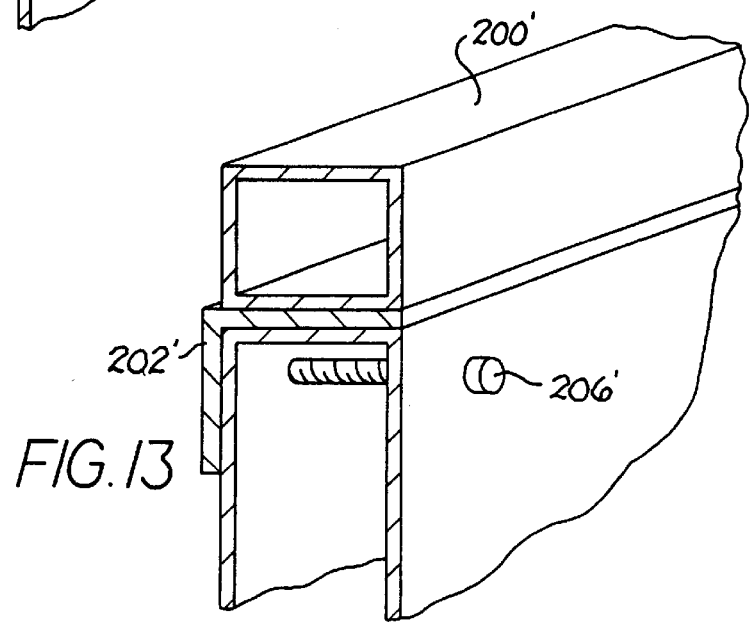
Figure 14:
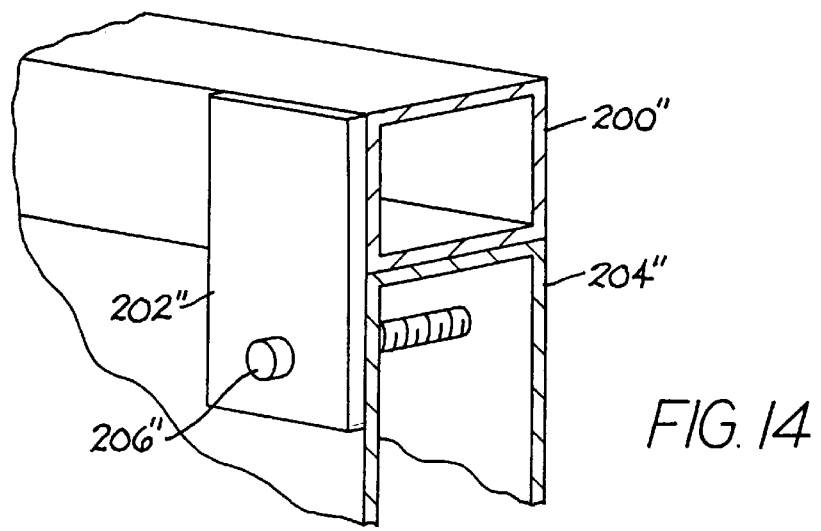

FIGS. 12–14 show other ways in which the rail can be mounted on the cargo box forward wall. Referring to FIG. 12, a rail 200 can have a series of U-shaped members 202 form to straddle the cargo box rim 204. U-shaped member 202 is welded to the bottom of the rail and then fastened by fastener means 206 to the rim.

In FIG. 13 rail 200' is welded to the top side of a short structural angle clip 202' which in turn is fastened by fastener means 206'.

In FIG. 14, rail 200" is welded to a vertical plate 202" which in turn is connected by a fastener 206" to the cargo box wall 204".

Other structures are possible.

Either of the versions illustrated in FIGS. 12, 13 or 14 can be used in conjunction with the well nut connection illustrated in FIG. 9.

Having described my invention, I claim:

1. A mounting system for connecting a load to the front wall of a pick-up truck cargo box, the front wall having an elongated rim located behind a truck cab, and a front opening facing the truck cab, the cab having a rear wall forward of the cargo box front wall, the apparatus comprising:

a rail mounted above a top edge of the front wall rim of the cargo box and parallel thereto, the rail having a forward opening facing the truck cab rear wall and disposed above said front opening;

a clamp having a body disposed between the front wall of the cargo box and the truck cab, the clamp having integral spaced upper and lower clamp arms, the upper clamp arm being disposed in the opening in the rail and the lower arm being disposed in the front opening of the front wall of the cargo box;

the clamp lower arm having a clamping toe extending toward the upper clamp arm and suited to abut the rim of the truck front wall, the clamp upper arm having a tapped opening aligned with the toe on the lower clamp arm;

a clamping screw disposed in the tapped opening of the upper arm and in abutment with the rail such that the rail is clamped between the clamping screw and the clamping toe to connect the rail to the pick-up cargo box; and eye means, on the rail for connecting a load to the cargo box.

2. A mounting system as defined in claim 1, including the rail having a top access opening above the tapped opening of the upper arm, and a cap mounted in the access opening in the rail.

3. A mounting system as defined in claim 1, including a pad mounted between the rail and the cargo box rim to protect the rim finish.

4. A mounting system as defined in claim 1, including at least one additional clamp spaced along the rail for clamping the rail to the cargo box rim.

5. A mounting system as defined in claim 1, in which the cargo box has a pair of sidewalls joined to opposite ends of the front wall, each sidewall having a top rim, the rail having a length accommodating the distance between the top rims of the sidewalls;

a first wing attached to one end of the rail and disposed on one of the sidewalls of the cargo box rearwardly of the front wall, and a second wing attached to the opposite end of the rail and disposed on the other sidewall rearwardly of the front wall, the first and second wings cooperating to prevent bending of the front wall when a horizontal load is applied to the rail.

6. A mounting system as defined in claim 1, in which the means for connecting a load to the cargo box include an eye member fastened to the rail.

7. A mounting system as defined in claim 1, in which the means for connecting a load include a channel-shaped bracket slidably mounted on the rail with a pair of apertured sidewalls on opposite sides of the rail, and a fastener disposed through said side wall apertures for connecting the bracket to the rail.

8. A mounting system as defined in claim 5, in which the means for connecting a load comprises an eye in each of said wings.

* * * * *